(12) United States Patent
Chern et al.

(10) Patent No.: US 10,914,962 B2
(45) Date of Patent: Feb. 9, 2021

(54) STRUCTURED LIGHT MODULE WITH FASTENING ELEMENT

(71) Applicant: EVERREADY PRECISION IND. CORP., Kaohsiung (TW)

(72) Inventors: Jyh-Long Chern, Zhubei (TW); Chih-Ming Yen, Taipei (TW)

(73) Assignee: EVERREADY PRECISION IND. CORP, Kaohsiung (TW)

( * ) Notice: Subject to any disclaimer, the term of this patent is extended or adjusted under 35 U.S.C. 154(b) by 0 days.

(21) Appl. No.: 16/806,686

(22) Filed: Mar. 2, 2020

(65) Prior Publication Data

US 2020/0201062 A1 Jun. 25, 2020

Related U.S. Application Data

(63) Continuation-in-part of application No. 15/240,494, filed on Aug. 18, 2016, now Pat. No. 10,620,350.

(30) Foreign Application Priority Data

Aug. 21, 2015 (TW) .............................. 104213576 U

(51) Int. Cl.
  *G02B 27/00* (2006.01)
  *G02B 27/42* (2006.01)

(52) U.S. Cl.
  CPC .................. *G02B 27/425* (2013.01)

(58) Field of Classification Search
  CPC .............. F21V 17/04–20; F21V 19/003–0055
  See application file for complete search history.

(56) References Cited

U.S. PATENT DOCUMENTS

| | | | |
|---|---|---|---|
| 2002/0136013 A1* | 9/2002 | Crunk | B60Q 1/2696 362/362 |
| 2007/0171662 A1* | 7/2007 | Tokida | F21V 29/74 362/459 |
| 2010/0046224 A1* | 2/2010 | Lin | F21S 4/28 362/249.02 |
| 2010/0072505 A1* | 3/2010 | Gingrich, III | F21V 17/005 257/99 |
| 2010/0142202 A1* | 6/2010 | Sugishita | F21V 7/0083 362/235 |
| 2011/0116752 A1* | 5/2011 | Singer | F21S 41/153 385/88 |
| 2012/0147608 A1* | 6/2012 | Kawagoe | F21V 19/0055 362/294 |
| 2012/0155080 A1* | 6/2012 | Schupple | F21V 29/80 362/235 |

(Continued)

*Primary Examiner* — Gerald J Sufleta, II

(74) *Attorney, Agent, or Firm* — Muncy, Geissler, Olds & Lowe, P.C.

(57) ABSTRACT

A structured light module is combinable with a frame. The structured light module includes a housing, a light-emitting unit, at least one corresponding optical element, a circuit board, at least one fastening element, and at least one symbol. Due to the at least one symbol, the positioning accuracy of the structured light module in the assembling process is enhanced. The light-emitting unit is disposed on the circuit board and accommodated within the housing. The at least one fastening element is connected with one of the housing and the circuit board. When the at least one fastening element is combined with a frame, the structured light module is positioned on the frame.

19 Claims, 8 Drawing Sheets

(56) References Cited

U.S. PATENT DOCUMENTS

| | | | |
|---|---|---|---|
| 2012/0311849 A1* | 12/2012 | Lee | H05K 7/20 29/592.1 |
| 2013/0034989 A1* | 2/2013 | Vogt | H01R 33/46 439/485 |
| 2013/0121759 A1* | 5/2013 | Breidenassel | F21V 7/00 403/330 |
| 2014/0133163 A1* | 5/2014 | Scordino | F21V 17/105 362/368 |
| 2014/0247611 A1* | 9/2014 | Sachsenweger | F21V 17/08 362/418 |
| 2014/0355269 A1* | 12/2014 | Ohno | F21V 13/04 362/269 |
| 2015/0159816 A1* | 6/2015 | Preuschl | F21K 9/20 362/249.02 |
| 2015/0260376 A1* | 9/2015 | Joo | F21S 45/48 362/235 |
| 2016/0195249 A1* | 7/2016 | Liao | F21V 17/10 362/368 |
| 2017/0003004 A1* | 1/2017 | Ho | F21V 29/70 |

* cited by examiner

STRUCTURED LIGHT MODULE WITH FASTENING ELEMENT

CROSS-REFERENCE TO RELATED APPLICATION

This application is continuation-in-part application of U.S. patent application Ser. No. 15/240,494, filed Aug. 18, 2016, which claims priority to Taiwan Application No. 104213576 filed Aug. 21, 2015 and hereby incorporates both applications in their entirety by reference.

BACKGROUND OF THE INVENTION

Field of the Invention

The present invention relates to a structured light module, and more particularly to a structured light module with a fastening element.

BACKGROUND OF THE INVENTION

With the advance of science and technology, the developments of fabricating many miniature objects are progressively established. For example, one of them, that is, the trends of developing laser diodes are toward reduced volume. Moreover, as the functions of electronic devices are increasingly diversified in the electronic industries, laser diodes are installed in mobile electronic devices because of the novelty of lasers in light field applications. This laser source (i.e., the laser diode) and other optical elements can be cooperatively used to provide more different and novel functions. To mention a few, they can be different structured light patterns to be generated to meet the requirements of the motion sensitive applications.

Take a mobile electronic device with a laser diode as an example. The laser diode is disposed on a circuit board. An electric connection part is extended externally from a lateral edge of the circuit board. Through the electric connection part, the circuit board is electrically connected with other electronic components. Due to the structure and the material properties of the electric connection part, the electric connection part can facilitate maintaining a fixed relative position between the laser diode and a frame or positioning the laser diode.

Moreover, different wavelength of laser emission has different transmission efficiency in environment as well as to the sensor's sensitivity. In some of circumstance, a requirement of installation of more than one wavelength band, e.g., 850 nm, 947 nm, 1350 nm and even the wavelength at far infrared (FIR), would be appropriate for safety and fast response in detection and sensing. Meanwhile the location correction of these laser sources and sensing elements could be crucial. As mentioned above, when we consider the enhancement of sensing efficiency and information reconstruction, a higher precision control of positions and orientations for all correlated elements (either laser sources or sensing elements) is considered to be necessary.

However, the way of positioning laser diode through the circuit board still has some drawbacks. For example, if the mobile electronic device has been used for a long time, the mobile electronic device has been subjected to many times of impact, shock or drop. Finally, the circuit board is possibly upturned or shifted. Consequently, the original position of the circuit board relative to the frame cannot be maintained. Moreover, since the circuit board is not in the right position or the position of the circuit board is shifted, the heat dissipating mechanism or the heat dissipating path of the laser diode structured light module is possibly deviated. Under this circumstance, the heat dissipating efficacy loses or the heat dissipating efficiency is deteriorated.

Moreover, for generating a structured light pattern, the laser diode structured light module needs to have a corresponding lens unit. The assembling process comprises the following steps. Firstly, the circuit board with the laser diode is fixed on the mobile electronic device. Then, the laser diode is installed in the mobile electronic device and aligned with the laser diode. These steps increase the assembling complexity and the assembling time, and largely increase the labor cost.

Therefore, it is an important issue to provide a laser diode structured light module. In the laser diode structured light module, multiple laser sources may own different wavelength bands and sensing elements. The laser diode structured light module can provide good positioning efficacy while maintaining the heat dissipating efficacy and the lighting efficacy. Moreover, the structured light module with another light source such as a light emitting diode (monochromatic or polychromatic), an organic light emitting diode or a thermal source also needs to solve the above drawbacks or similar drawbacks.

SUMMARY OF THE INVENTION

An object of the present invention provides a laser diode structured light module or a comparable structured light module with a fastening element. The fastening element is connected with one of a housing and a circuit board. Through the fastening element of the structured light module, the laser diode structured light module is combined with a frame and positioned on the frame. Moreover, at least one symbols of the structured light module can facilitate recognizing the positioning accuracy of assembling the associated elements. That is, the positioning accuracy is enhanced. Consequently, when the structured light beams generated by the structured light module of the present invention is used for various sensing applications, the structured light beams are effective for extracting the sensing information and/or establishing models.

In accordance with an aspect of the present invention, there is provided a structured light module. The structured light module is combinable with a frame. The structured light module includes a housing, a light-emitting unit, a circuit board, a lens unit, at least one fastening element, and at least one symbol. The light-emitting unit is accommodated within the housing, and emits plural light beams. The light-emitting unit is disposed on the circuit board. After the plural light beams pass through the lens unit, a structured light is generated and outputted. The at least one fastening element is connected with one of the housing and the circuit board. When the structured light module is placed on an assembling region of the frame, the at least one fastening element is combined with the frame, so that the structured light module is positioned on the frame. The at least one symbol is formed on at least one of the housing, the light-emitting unit, the circuit board, the lens unit and the at least one fastening element, wherein a positioning information of the structured light module is acquired according to the at least one symbol.

In an embodiment, the positioning information contains an information about a position and/or an orientation of the at least one of the housing, the light-emitting unit, the circuit board, the lens unit and the at least one fastening element, and/or the positioning information contains an information about a relative relationship between at least two of an optical axis of the light-emitting unit, the housing, the light-emitting unit, the circuit board, the lens unit and the at least one fastening element.

In an embodiment, the positioning information is obtained through visual detection of a machine.

In an embodiment, the entirety of the structured light module is formed as a single monolithic structure and installed on the frame via the at least one fastening element, and the light-emitting unit and the lens unit are separated from the frame by the housing.

In an embodiment, the at least one fastening element includes a plate, the plate is connected with the circuit board, and the plate includes at least one first engaging part. When the structured light module is placed on the assembling region of the frame, the at least one first engaging part is engaged with at least one second engaging part of the frame.

In an embodiment, the at least one first engaging part includes a positioning post and the at least one second engaging part includes a positioning hole. Alternatively, the at least one first engaging part includes a positioning hole and the at least one second engaging part includes a positioning post.

In an embodiment, the plate is a heat dissipating plate, and the heat dissipating plate is made of a metallic material or a comparable material with good thermal conductivity.

In an embodiment, the at least one fastening element includes a transparent slab corresponding to the plural light beams, the transparent slab is connected with the housing, the lens unit is arranged between the light-emitting unit and the transparent slab, and the transparent slab includes at least one first engaging part. When the structured light module is placed on the assembling region of the frame, the at least one first engaging part is engaged with at least one second engaging part of the frame.

In an embodiment, the at least one fastening element includes a slab, the slab is connected with the housing, the lens unit is embedded within the slab, and the slab includes at least one first engaging part. When the structured light module is placed on the assembling region of the frame, the at least one first engaging part is engaged with at least one second engaging part of the frame.

In an embodiment, the at least one fastening element includes a transparent slab corresponding to the plural light beams, the transparent slab is connected with the housing, the transparent slab and the lens unit are integrally formed with each other, and the transparent slab includes at least one first engaging part. When the structured light module is placed on the assembling region of the frame, the at least one first engaging part is engaged with at least one second engaging part of the frame.

In an embodiment, the at least one first engaging part includes a positioning post and the at least one second engaging part includes a positioning hole. Alternatively, the at least one first engaging part includes a positioning hole and the at least one second engaging part includes a positioning post.

In an embodiment, the circuit board is a flexible circuit board or an ordinary printed circuit board, and the circuit board includes a terminal. The terminal is extended externally from a lateral edge of the circuit board, and the terminal is electrically connected with an electronic component on the frame.

In an embodiment, two extension parts are extended externally from two ends of the fastening element, and profiles of the two extension parts match a profile of an accommodation cavity of the frame. When the structured light module is placed on the assembling region of the frame, the fastening element is embedded within the accommodation cavity of the frame through the two extension parts.

In an embodiment, the light-emitting unit includes at least one of a laser diode (LD), a light emitting diode (LED), an organic light emitting diode (OLED) and a thermal source.

In an embodiment, the light beams emitted by the light-emitting unit have wavelengths in a first wavelength band and a second wavelength band.

In an embodiment, the fastening element is not an integral one-piece element. The fastening element is an assembly of plural coupling parts or adhering parts.

In an embodiment, the fastening element is not made of a single material. The fastening element is a composite structure made of plural materials which includes a light-transmissible material and an opaque material or a heat-dissipating material or a thermally conductive material.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
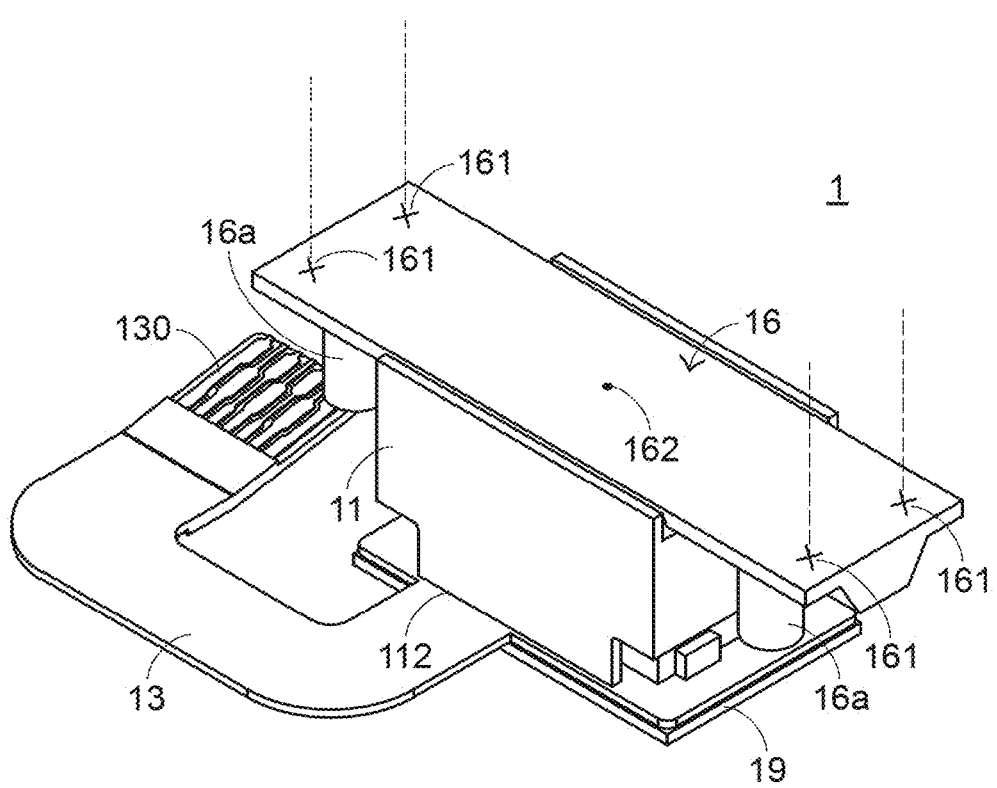
FIG. 1 is a schematic perspective view illustrating a structured light module with a fastening element according to a first embodiment of the present invention.
Figure 2:
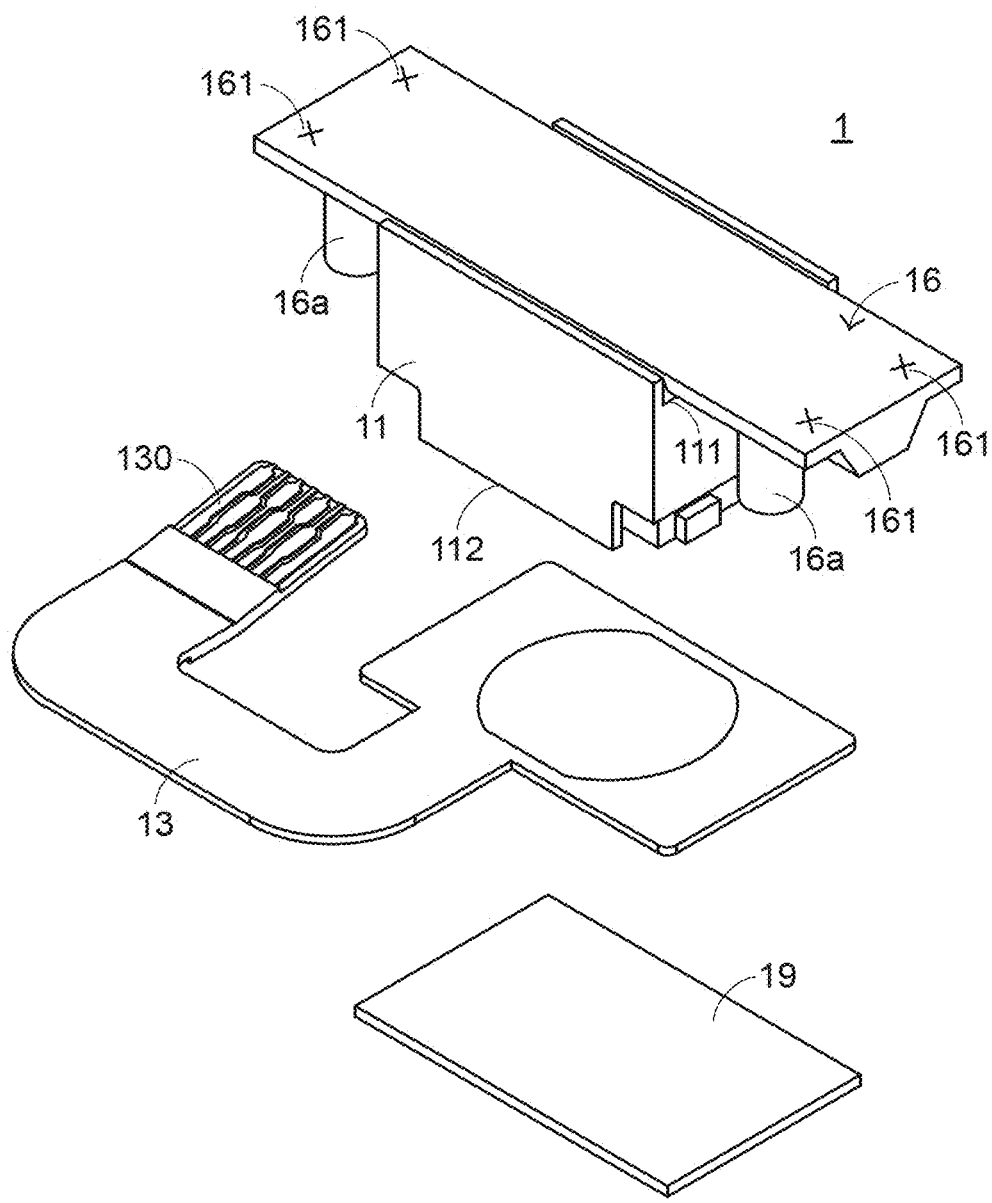
FIG. 2 is a schematic exploded view illustrating the structured light module according to the first embodiment of the present invention.

FIG. 1 is a schematic perspective view illustrating a structured light module with a fastening element according to a first embodiment of the present invention. FIG. 2 is a schematic exploded view illustrating the structured light module according to the first embodiment of the present invention. Please refer to FIGS. 1 and 2. From the outer appearance, the structured light module 1 comprises a housing 11, a circuit board 13 and a fastening element 16. The housing 11 is a hollow box that has four lateral walls and an opening running through a top side and a bottom side. A bottom opening end 112 of the housing 11 is fixed on the circuit board 13. The circuit board 13 comprises a terminal 130. The terminal 130 is extended externally from a lateral edge of the circuit board 13. Through the terminal 130, the circuit board 13 is electrically connected with other electronic components. An example of the circuit board 13 is a flexible circuit board or an ordinary printed circuit board.

In this embodiment, the fastening element 16 is connected with a top opening end 111 of the housing 11. The fastening element 16 comprises at least one first engaging part 16a. The at least one first engaging part 16a is used as an engaging structure to be coupled with a frame (not shown). Moreover, an optical component for generating a structured light, or a diffractive optical element or any other equivalent optical component is located at a middle position of the fastening element 16. In an embodiment, the fastening element 16 is an integral one-piece element. Alternatively, the fastening element 16 is an assembly of plural coupling parts or adhering parts. In an embodiment, the fastening element 16 is made of a single material. Alternatively, the fastening element 16 is a composite structure made of plural materials. For example, the plural materials include a light-transmissible material and an opaque material or a heat-dissipating material or a thermally conductive material.

Figure 3:
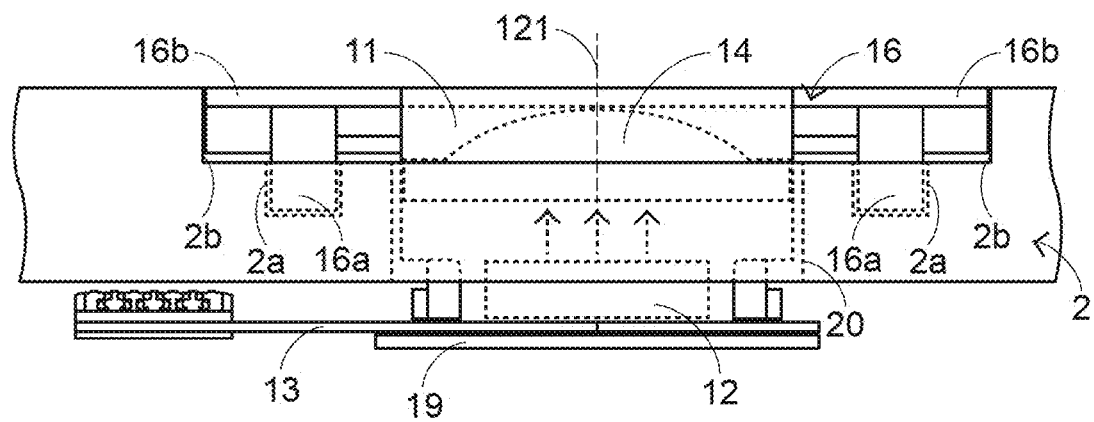
FIG. 3 is a schematic cross-sectional view illustrating the combination of the structured light module of the first embodiment and a frame.

FIG. 3 is a schematic cross-sectional view illustrating the combination of the structured light module of the first embodiment and a frame. Please also refer to FIG. 3. The structured light module 1 further comprises a light-emitting unit 12 and a lens unit 14. The light-emitting unit 12 is disposed on the circuit board 13 and accommodated within the housing 11. The lens unit 14 is also accommodated within the housing 11. Moreover, a periphery of the lens unit 14 is contacted with and fixed on an inner surface of the housing 11, and the lens unit 14 is disposed over the light-emitting unit 12. The light-emitting unit 12 emits plural light beams. After the light beams pass through the lens unit 14, the light beams are outputted from the top opening end 111 of the housing 11. Moreover, the optical component for generating the structured light, or the diffractive optical element or any other equivalent optical component is located at the middle position of the fastening element 16. Consequently, the structured light module 1 can provide the basic lighting function.

An example of the light-emitting unit 12 includes but is not limited to a laser diode (LD), a light emitting diode (LED), an organic light emitting diode (OLED) and/or a thermal source. Alternatively, the light-emitting unit 12 is a combination of at least two of the laser diode (LD), the light emitting diode (LED), the organic light emitting diode (OLED) and the thermal source, and the light-emitting unit 12 can emit light beams in different wavelength bands. For example, light beams emitted by the light-emitting unit 12 have wavelengths in a first wavelength band and a second wavelength band.

A process of assembling the structured light module 1 with a frame 2 will be described as follows. In the following description, the frame 2 is an intermediate frame of a mobile electronic device. It is noted that the example of the frame 2 is not restricted.

Please refer to FIGS. 1, 2 and 3 again. The frame 2 comprises a second engaging part 2a. The shape of the second engaging part 2a matches the shape of the first engaging part 16a of the fastening element 16. Consequently, the first engaging part 16a and the second engaging part 2a can be engaged with each other. Particularly, the frame 2 has an assembling region 20. For installing the structured light module 1 on the frame 2, the structured light module 1 is placed to the assembling region 20 of the frame 2 and thus the first engaging part 16a of the fastening element 16 is engaged with the second engaging part 2a of the frame 2. Consequently, the structured light module 1 is positioned on the frame 2. After the structured light module 1 and the frame 2 are combined together, the engagement between the first engaging part 16a and the second engaging part 2a can provide a position-limiting function of preventing movement the structured light module 1 relative to the frame 2.

Preferably, the frame 2 comprises an accommodation cavity. The shape of the accommodation cavity matches the shape of the structured light module 1. Consequently, while the structured light module 1 is placed on the assembling region 20 of the frame 2, the structured light module 1 is also embedded within the accommodation cavity of the frame 2. For example, two extension parts 16b are extended externally from two ends of the main body of the fastening element 16. The profiles of the two extension parts 16b match the profiles of the corresponding inner walls 2b of the accommodation cavity of the frame 2. After the structured light module 1 is placed on the assembling region 20 of the frame 2, the two extension parts 16b of the fastening element 16 of the structured light module 1 are contacted with the inner walls 2b of the frame 2. Consequently, the efficacy of positioning the structured light module 1 is enhanced.

For increasing the heat-dissipating efficiency, the structured light module 1 further comprises a heat dissipating plate 19. The length and the width of the heat dissipating plate 19 are nearly equal to those of the circuit board 13. Moreover, the surface of the heat dissipating plate 19 with the largest area is attached on the circuit board 13. Consequently, a greater portion of the heat from the circuit board 13 can be received by the heat dissipating plate 19 in a short time. Then, the heat is quickly dissipated away to the surroundings. Preferably, the heat dissipating plate 19 is made of a metallic material or any other material with good thermal conductivity.

Three examples of the assembly of the lens unit and the fastening element of the structured light module will be described in more details as follows.

A first example of the lens unit is shown in FIG. 3. In this embodiment, the fastening element 16 is a transparent slab. The fastening element 16 is connected with the housing 11. The lens unit 14 is arranged between the light-emitting unit 12 and the transparent slab. After the light beams emitted by the light-emitting unit 12 pass through the lens unit 14 and the transparent slab sequentially, the light beams are outputted. Preferably but not exclusively, the lens unit 14 is a collimating lens, and the transparent slab is a diffractive optical element. Moreover, the transparent slab comprises two first engaging parts 16a, and the first engaging parts 16a are positioning posts. The frame 2 comprises two second engaging parts 2a, and the second engaging parts 2a are positioning holes. When the structured light module 1 is placed on the assembling region 20 of the frame 2, the two positioning posts are inserted in the corresponding positioning holes. Consequently, the structured light module 1 is combined with and positioned on the frame 2. It is noted that the orientations or positions of the first engaging parts 16a and the second engaging parts 2a are not restricted. Moreover, the numbers of the first engaging parts 16a and the second engaging parts 2*a* may be varied according to the practical requirements. For example, the fastening element 16 comprises three, four or more first engaging parts 16*a*, and the frame 2 comprises three, four or more second engaging parts 2*a*. It is noted that numerous modifications and alterations may be made while retaining the teachings of the invention. For example, in another embodiment, the first engaging parts 16*a* are positioning holes, and the second engaging parts 2*a* are positioning posts. Under this circumstance, the above purpose is also achieved.

Figure 4:
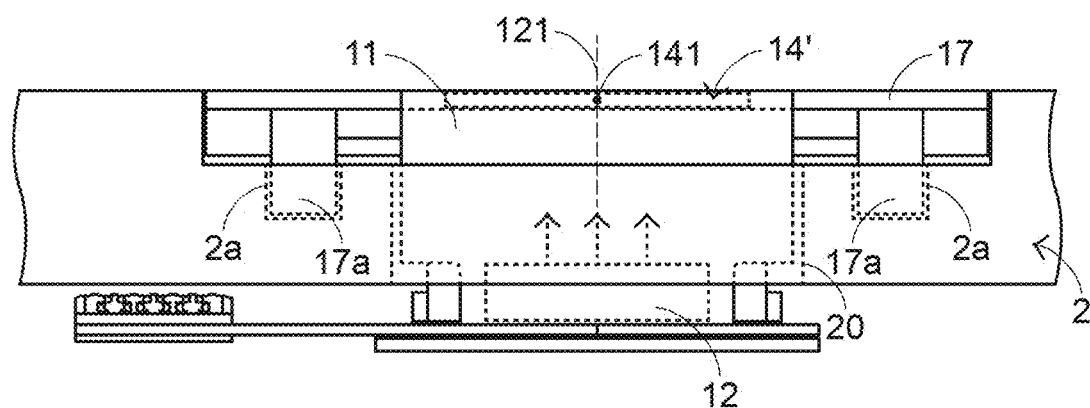
FIG. 4 is a schematic cross-sectional view illustrating a variant example of the combination of the structured light module of the first embodiment and a frame.

FIG. 4 is a schematic cross-sectional view illustrating a variant example of the combination of the structured light module of the first embodiment and a frame. A second example of the lens unit is shown in FIG. 4. In this embodiment, the fastening element is a slab 17. The slab 17 is made of a light-transmissible material or an opaque material. The slab 17 is connected with the housing 11. The lens 14' is embedded within the slab 17. After the light beams emitted by the light-emitting unit 12 pass through the lens unit 14' that is embedded within the slab 17, the light beams are outputted. Preferably but not exclusively, the lens unit 14' is a diffractive optical element. Moreover, the slab 17 comprises two first engaging parts 17*a*, and the first engaging parts 17*a* are positioning posts. The frame 2 comprises two second engaging parts 2*a*, and the second engaging parts 2*a* are positioning holes corresponding to the positioning posts. When the structured light module 1 is placed on the assembling region 20 of the frame 2, the two positioning posts are inserted in the corresponding positioning holes. Consequently, the structured light module 1 is combined with and positioned on the frame 2. It is noted that the numbers of the first engaging parts 17*a* and the second engaging parts 2*a* and the shape of the lens unit 14' may be varied according to the practical requirements. In another embodiment, the first engaging parts 17*a* are positioning holes, and the second engaging parts 2*a* are positioning posts. Under this circumstance, the above purpose is also achieved.

Figure 5:
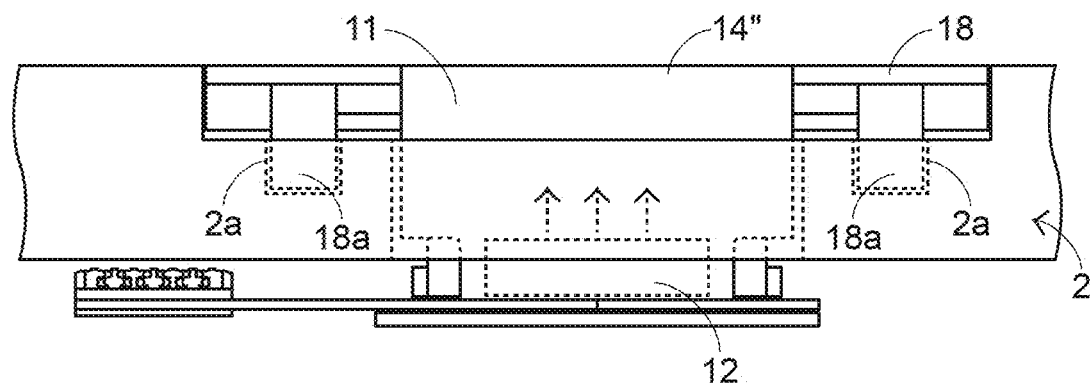
FIG. 5 is a schematic cross-sectional view illustrating another variant example of the combination of the structured light module of the first embodiment and a frame.

FIG. 5 is a schematic cross-sectional view illustrating another variant example of the combination of the structured light module of the first embodiment and a frame. A third example of the lens unit is shown in FIG. 5. In this embodiment, the fastening element is a transparent slab 18. The transparent slab 18 is connected with the housing 11. The transparent slab 18 and the lens unit 14" are integrally formed with each other. After the light beams emitted by the light-emitting unit 12 pass through the lens unit 14" that is integrally formed with the transparent slab 18, the light beams are outputted. Preferably but not exclusively, the lens unit 14" is a diffractive optical element. Moreover, the transparent slab 18 comprises two first engaging parts 18*a*, and the first engaging parts 18*a* are positioning posts. The frame 2 comprises two second engaging parts 2*a*, and the second engaging parts 2*a* are positioning holes corresponding to the positioning posts. When the structured light module 1 is placed on the assembling region 20 of the frame 2, the two positioning posts are inserted in the corresponding positioning holes. Consequently, the structured light module 1 is combined with and positioned on the frame 2. It is noted that the numbers of the first engaging parts 18*a* and the second engaging parts 2*a* and the shape of the lens unit 14' may be varied according to the practical requirements. In another embodiment, the first engaging parts 18*a* are positioning holes, and the second engaging parts 2*a* are positioning posts. Under this circumstance, the above purpose is also achieved.

Figure 6:
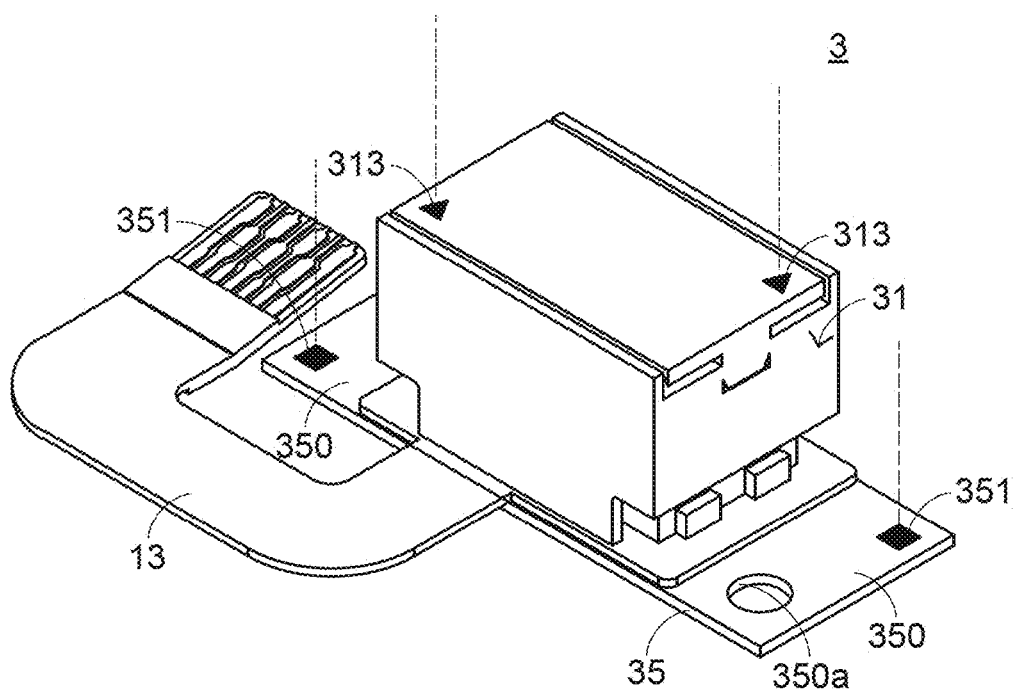
FIG. 6 is a schematic perspective view illustrating a structured light module with a fastening element according to a second embodiment of the present invention.
Figure 7:
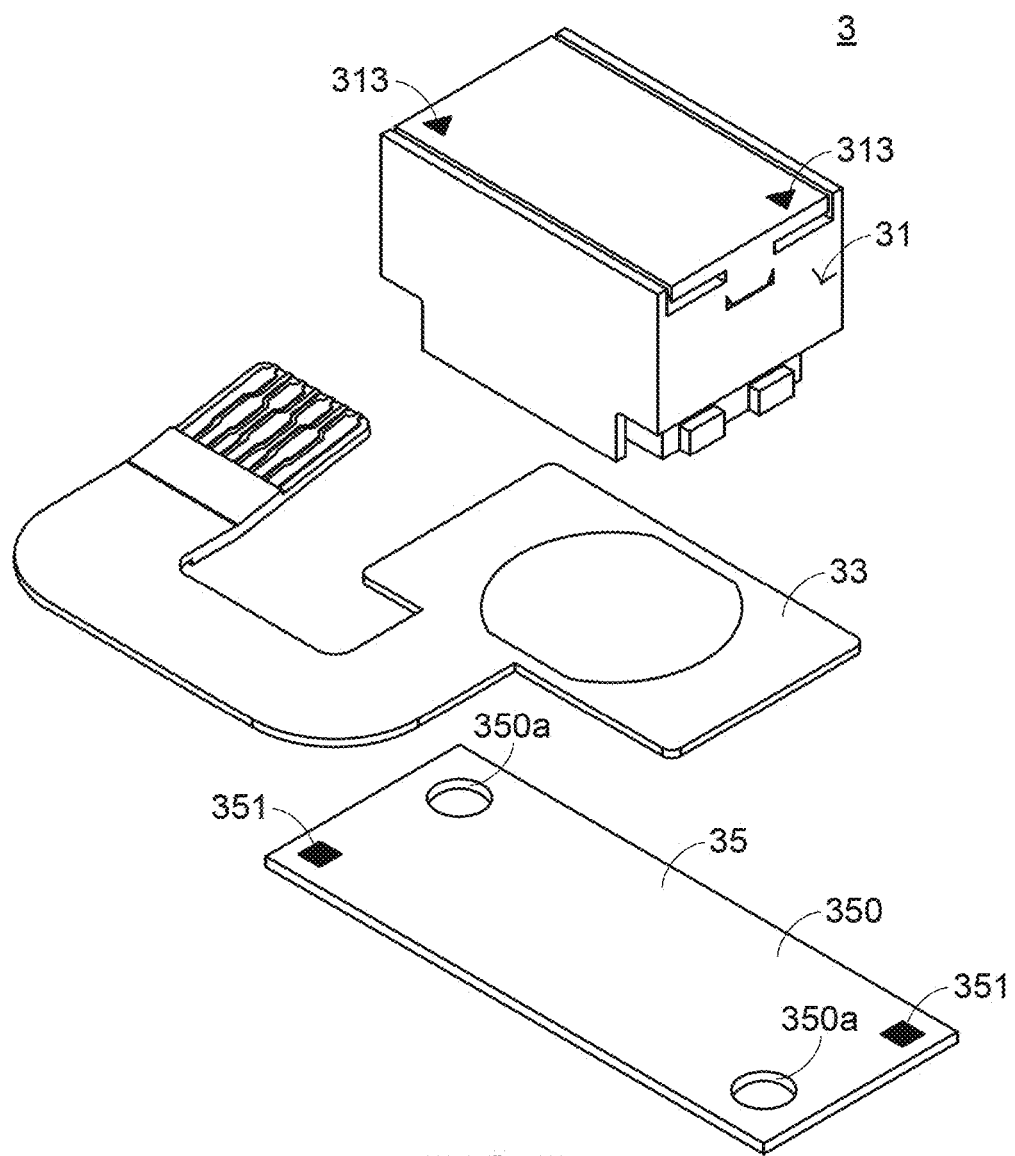
FIG. 7 is a schematic exploded view illustrating the structured light module according to the second embodiment of the present invention.
Figure 8:
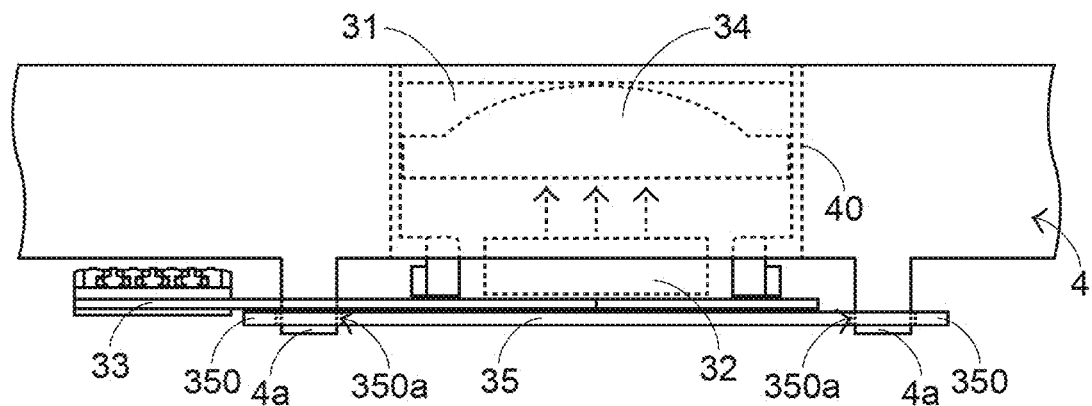
FIG. 8 is a schematic cross-sectional view illustrating the combination of the structured light module of the second embodiment and a frame.

FIG. 6 is a schematic perspective view illustrating a structured light module with a fastening element according to a second embodiment of the present invention. FIG. 7 is a schematic exploded view illustrating the structured light module according to the second embodiment of the present invention. FIG. 8 is a schematic cross-sectional view illustrating the combination of the structured light module of the second embodiment and a frame. Please refer to FIGS. 6, 7 and 8. Like the first embodiment, the essential components of the structured light module 3 of this embodiment comprises a housing 31, a light-emitting unit 32, a circuit board 33, a lens unit 14 and a fastening element. In comparison with the first embodiment, the fastening element is a plate 35. Preferably, the plate 35 is heat dissipating plate that is made of a metallic material. Moreover, the surface of the plate 35 with the largest area is attached on the circuit board 33. Consequently, a greater portion of the heat from the circuit board 33 can be quickly dissipated away to the surroundings in a short time. In this embodiment, the plate 35 comprises two extension parts 350. Consequently, the plate 35 is longer than the heat dissipating plate 19 of the first embodiment. Moreover, two first engaging parts 350*a* are located at the two extension parts 350, respectively. The first engaging parts 350*a* are used to be coupled with a frame 4. When the structured light module 3 is placed on an assembling region 40 of the frame 4, the first engaging parts 350*a* of the plate 35 are engaged with the corresponding second engaging parts 4*a* of the frame 4.

In this embodiment, the two first engaging parts 350*a* of the extension parts 350 are positioning holes. The frame 4 comprises two second engaging parts 4*a*, and the second engaging parts 4*a* are positioning posts corresponding to the positioning holes. When the structured light module 3 is placed on the assembling region 40 of the frame 4, the two positioning posts are inserted in the corresponding positioning holes. Consequently, the structured light module 3 is combined with and positioned on the frame 4. It is noted that the numbers of the first engaging parts 350*a* and the second engaging parts 4*a* may be varied according to the practical requirements. In another embodiment, the first engaging parts 350*a* are positioning posts, and the second engaging parts 4*a* are positioning holes. Under this circumstance, the above purpose is also achieved. The functions and structures of the other components of the second embodiment are similar to those of the first embodiment, and are not redundantly described herein.

Figure 9:
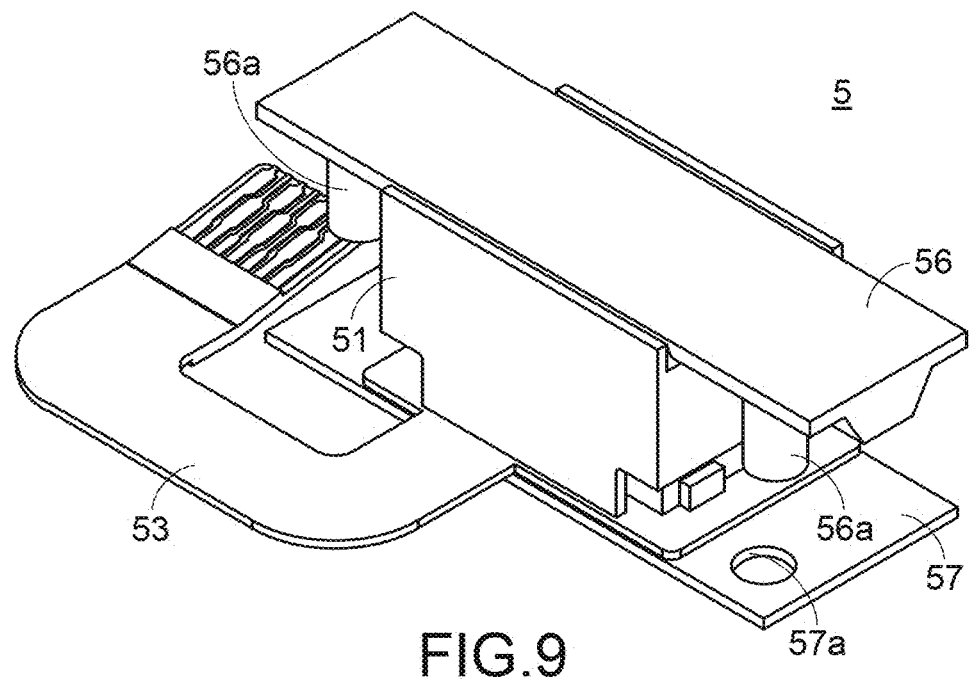
FIG. 9 is a schematic perspective view illustrating a structured light module with a fastening element according to a third embodiment of the present invention.
Figure 10:
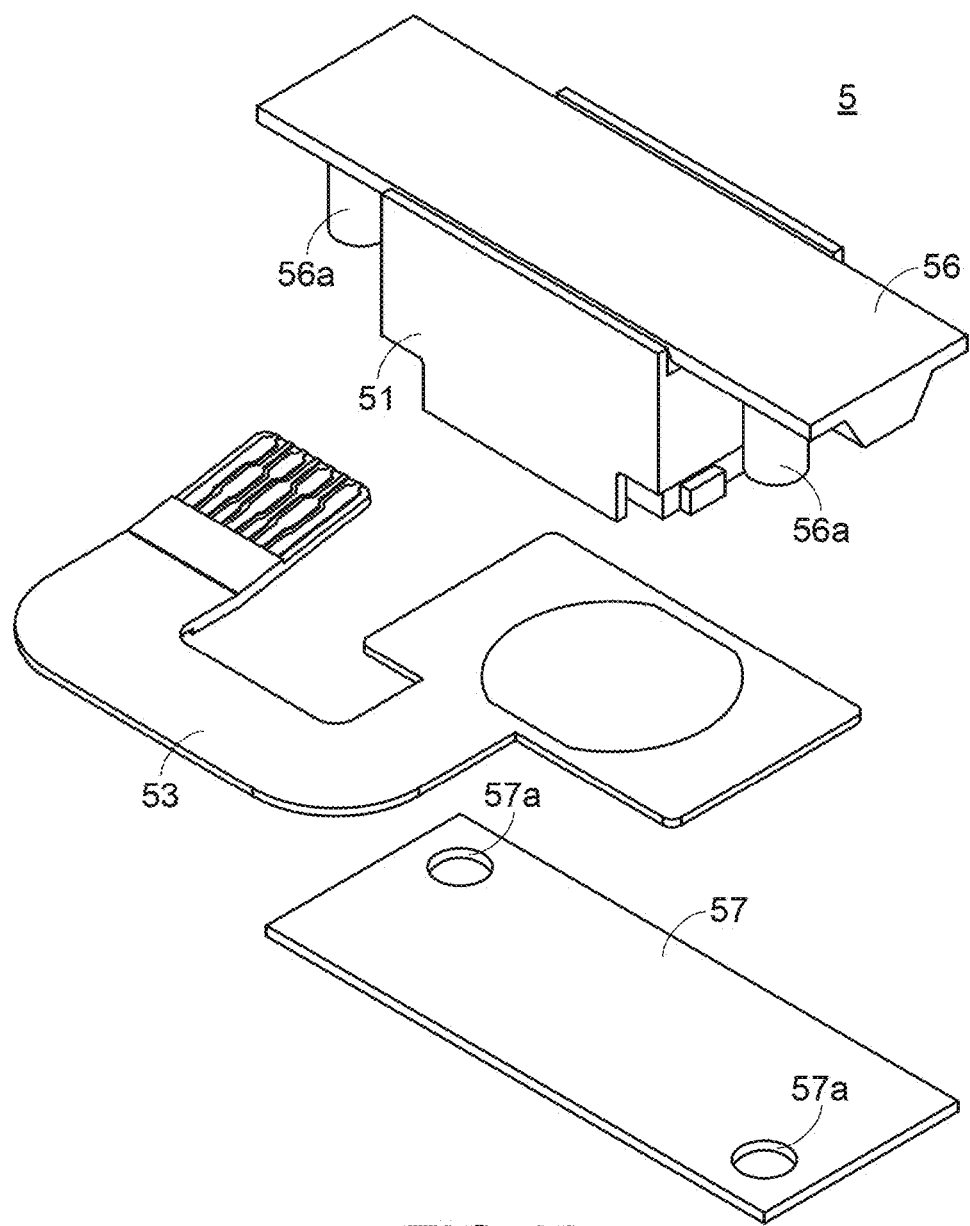
FIG. 10 is a schematic exploded view illustrating the structured light module according to the third embodiment of the present invention.
Figure 11:
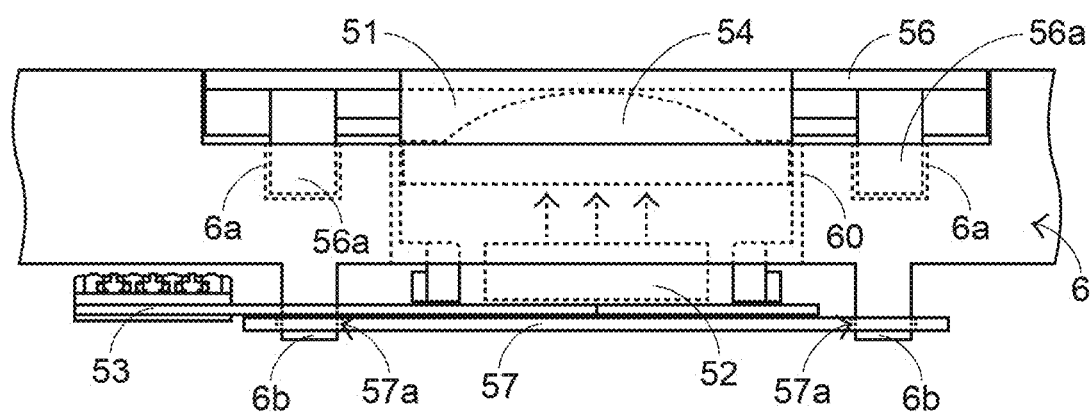
FIG. 11 is a schematic cross-sectional view illustrating the combination of the structured light module of the third embodiment and a frame.

FIG. 9 is a schematic perspective view illustrating a structured light module with a fastening element according to a third embodiment of the present invention. FIG. 10 is a schematic exploded view illustrating the structured light module according to the third embodiment of the present invention. FIG. 11 is a schematic cross-sectional view illustrating the combination of the structured light module of the third embodiment and a frame. Please refer to FIGS. 9, 10 and 11. The third embodiment is similar to the first embodiment and the second embodiment. Particularly, the third embodiment is the combination of the first embodiment and the second embodiment. As shown in FIGS. 9, 10 and 11, the structured light module 5 of this embodiment comprises a housing 51, a light-emitting unit 52, a circuit board 53, a lens unit 54, a first fastening element 56 and a second fastening element 57. The first fastening element 56 is similar to the fastening element of the first embodiment, and coupled with the housing 51. The second fastening element 57 is similar to the fastening element of the second embodiment, and coupled with the circuit board.

That is, the structured light module 5 of this embodiment comprises the fastening elements of the above two embodiments. When the structured light module 5 is placed on an assembling region 60 of the frame 6, the first engaging parts 56a of the first fastening element 56 are engaged with the corresponding second engaging parts 6a of the frame 6, and the third engaging parts 57a of the second fastening element 57 are engaged with the corresponding fourth engaging parts 6b of the frame 6. Consequently, the structured light module 5 is combined with and positioned on the frame 5. Under this circumstance, the position-limiting efficacy of preventing movement the structured light module 5 relative to the frame 6 will be largely enhanced. The functions and structures of the other components of the second embodiment are similar to those of the first embodiment, and are not redundantly described herein.

Moreover, for increasing the positioning accuracy in the assembling process, the structured light module of the present invention further comprises at least one symbol. The at least one symbol is formed on at least one of the housing, the light-emitting unit, the circuit board, the lens unit and the fastening element. According to the at least one symbol, the positioning information of the structured light module is acquired. For example, the positioning information contains the information about the position and/or the orientation of the at least one of the housing, the light-emitting unit, the circuit board, the lens unit and the fastening element. Alternatively, the positioning information contains the information about the relative relationships between at least two of the optical axis of the light-emitting unit, the housing, the light-emitting unit, the circuit board, the lens unit and the fastening element, which will be described later. The at least one symbol may be formed or presented on a transparent mask in a scribbled manner. The positioning information may be obtained through visual detection of a machine. It is noted that the way of forming the symbol and the way of acquiring the positioning information through the system are not restricted.

Hereinafter, some examples of positioning applications of the structured light module in the assembling process will be illustrated. In the structured light module as shown in FIGS. 1, 2 and 3, four symbols 161 are formed on four corners of the fastening element 16. The positions of the four symbols 161 can be obtained through visual detection of a machine. In addition, a center position 162 of the four symbols 161 is realized according to the four symbols 161. If the relationship between the center position 162 and an optical axis 121 of the light-emitting unit 12 is acceptable, for example the center position 162 is arranged along the optical axis 121, the position of the fastening element 16 and the relative relationship between the fastening element 16 and the light-emitting unit 12 are confirmed.

In the structured light module as shown in FIG. 4, a symbol 141 is formed on a center of the lens unit 14', which is embedded within the slab 17. The position of the symbols 141 can be obtained through visual detection of a machine. If the relationship between the position of the symbol 141 and the optical axis 121 of the light-emitting unit 12 is acceptable, for example the position of the symbol 141 is arranged along the optical axis 121, the position of the lens unit 14' and the relative relationship between the lens unit 14' and the light-emitting unit 12 are confirmed.

In the structured light module as shown in FIGS. 6, 7 and 8, two symbols 313 are formed on two opposed corners of the housing 31 and two other symbols 351 are formed on two opposed corners of the fastening element 35. The positions of the symbols 313 and the positions of the symbols 351 can be obtained through visual detection of a machine. If the relationship between the position of the symbols 313 and the positions of the symbols 351 is acceptable, the positions of the housing 31 and the fastening element 35 and relationship between the housing 31 and the fastening element 35 are confirmed.

From the above descriptions, the structured light module can be securely combined with the frame because the structured light module additionally has at least one fastening element. Even if the structured light module has been used for a long time or the structured light module is subjected to impact, the relative position between the structured light module and the frame is maintained at the original position that the structured light module leaves the factory. Consequently, the position stability of the structured light module relative to other modules of the system is enhanced. Moreover, since the entirety of the structured light module is directly combined with the frame, it is not necessary to perform the step of installing the lens unit in the mobile electronic device and aligning the lens unit with the light-emitting unit. Consequently, the assembling complexity and the assembling time are largely reduced, and the fabricating cost is reduced. Because of the above benefits, the heat dissipating mechanism or the heat dissipating path can be maintained.

Moreover, the symbols of the structured light module can facilitate recognizing the positioning accuracy of assembling the associated elements. Preferably, all of the elements can be with positioning accuracy, e.g., typically sub-mm scale to a few ten um-level scale under demanding. That is, the positioning accuracy is enhanced. Consequently, when the structured light beams generated by the structured light module of the present invention is used for various sensing applications, the structured light beams are effective for extracting the sensing information and/or establishing models.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A structured light module assembly, comprising a frame and a structured light module combined with a frame, wherein the structured light module comprises:
   a housing;
   a light-emitting unit accommodated within the housing, and emitting plural light beams;
   a circuit board, wherein the light-emitting unit is disposed on the circuit board;
   a lens unit, wherein after the plural light beams pass through the lens unit, a structured light is generated and outputted;
   at least one fastening element connected with one of the housing and the circuit board, wherein the at least one fastening element includes at least one first engaging part to engage with at least one second engaging part of the frame, wherein when the structured light module is placed on an assembling region of the frame, the at least one first engaging part of the structured light module is combined with the at least one second engaging part of the frame, so that the structured light module is positioned on the frame; and at least one symbol formed on at least one of the housing, the light-emitting unit, the circuit board, the lens unit and the at least one fastening element, wherein a positioning information of the structured light module is acquired according to the at least one symbol.

2. The structured light module assembly according to claim 1, wherein the positioning information contains an information about a position and/or an orientation of the at least one of the housing, the light-emitting unit, the circuit board, the lens unit and the at least one fastening element, and/or the positioning information contains an information about a relative relationship between at least two of an optical axis of the light-emitting unit, the housing, the light-emitting unit, the circuit board, the lens unit and the at least one fastening element.

3. The structured light module assembly according to claim 1, wherein the positioning information is obtained through visual detection of a machine.

4. The structured light module assembly according to claim 1, wherein the entirety of the structured light module is formed as a single monolithic structure and installed on the frame via the at least one fastening element, and the light-emitting unit and the lens unit are separated from the frame by the housing.

5. The structured light module assembly according to claim 1, wherein the at least one fastening element comprises a plate, the plate is connected with the circuit board, and the plate comprises at least one first engaging part, wherein when the structured light module is placed on the assembling region of the frame, the at least one first engaging part is engaged with at least one second engaging part of the frame.

6. The structured light module assembly according to claim 5, wherein the at least one first engaging part includes a positioning post and the at least one second engaging part includes a positioning hole, or the at least one first engaging part includes a positioning hole and the at least one second engaging part includes a positioning post.

7. The structured light module assembly according to claim 6, wherein the plate is a heat dissipating plate, and the heat dissipating plate is made of a metallic material or a comparable material with good thermal conductivity.

8. The structured light module assembly according to claim 1, wherein the at least one fastening element comprises a transparent slab corresponding to the plural light beams, the transparent slab is connected with the housing, the lens unit is arranged between the light-emitting unit and the transparent slab, and the transparent slab comprises at least one first engaging part, wherein when the structured light module is placed on the assembling region of the frame, the at least one first engaging part is engaged with at least one second engaging part of the frame.

9. The structured light module assembly according to claim 8, wherein the at least one first engaging part includes a positioning post and the at least one second engaging part includes a positioning hole, or the at least one first engaging part includes a positioning hole and the at least one second engaging part includes a positioning post.

10. The structured light module assembly according to claim 1, wherein the at least one fastening element comprises a slab, the slab is connected with the housing, the lens unit is embedded within the slab, and the slab comprises at least one first engaging part, wherein when the structured light module is placed on the assembling region of the frame, the at least one first engaging part is engaged with at least one second engaging part of the frame.

11. The structured light module assembly according to claim 10, wherein the at least one first engaging part includes a positioning post and the at least one second engaging part includes a positioning hole, or the at least one first engaging part includes a positioning hole and the at least one second engaging part includes a positioning post.

12. The structured light module assembly according to claim 1, wherein the at least one fastening element comprises a transparent slab corresponding to the plural light beams, the transparent slab is connected with the housing, the transparent slab and the lens unit are integrally formed with each other, and the transparent slab comprises at least one first engaging part, wherein when the structured light module is placed on the assembling region of the frame, the at least one first engaging part is engaged with at least one second engaging part of the frame.

13. The structured light module assembly according to claim 12, wherein the at least one first engaging part includes a positioning post and the at least one second engaging part includes a positioning hole, or the at least one first engaging part includes a positioning hole and the at least one second engaging part includes a positioning post.

14. The structured light module assembly according to claim 1, wherein the circuit board is a flexible circuit board or an ordinary printed circuit board, and the circuit board comprises a terminal, wherein the terminal is extended externally from a lateral edge of the circuit board, and the terminal is electrically connected with an electronic component on the frame.

15. The structured light module assembly according to claim 1, wherein two extension parts are extended externally from two ends of the fastening element, and profiles of the two extension parts match a profile of an accommodation cavity of the frame, wherein when the structured light module is placed on the assembling region of the frame, the fastening element is embedded within the accommodation cavity of the frame through the two extension parts.

16. The structured light module assembly according to claim 1, wherein the light-emitting unit includes at least one of a laser diode (LD), a light emitting diode (LED), an organic light emitting diode (OLED) and a thermal source.

17. The structured light module assembly according to claim 1, wherein the light beams emitted by the light-emitting unit have wavelengths in a first wavelength band and a second wavelength band.

18. The structured light module assembly according to claim 1, wherein the fastening element is not an integral one-piece element, wherein the fastening element is an assembly of plural coupling parts or adhering parts.

19. The structured light module assembly according to claim 1, wherein the fastening element is not made of a single material, wherein the fastening element is a composite structure made of plural materials which includes a light-transmissible material and an opaque material or a heat-dissipating material or a thermally conductive material.

* * * * *